(12) United States Patent
Jang

(10) Patent No.: US 6,917,805 B1
(45) Date of Patent: Jul. 12, 2005

(54) METHOD OF MANAGING ADDITIONAL SERVICE INFORMATION OF A SUBSCRIBER IN A MOBILE COMMUNICATION SYSTEM

(75) Inventor: Kyung-Soon Jang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 611 days.

(21) Appl. No.: 09/653,145

(22) Filed: Aug. 31, 2000

(30) Foreign Application Priority Data

Aug. 31, 1999 (KR) ........................................ 1999-36616

(51) Int. Cl.7 ................................................ H04Q 7/20
(52) U.S. Cl. .................................. 455/433; 455/432.3
(58) Field of Search ................................ 455/433, 434, 455/435, 438, 403, 423, 428, 67.7, 154.1, 157.1, 158.1, 432.1, 418, 419, 517, 435.1–435.2, 414.1, 432.3

(56) References Cited

U.S. PATENT DOCUMENTS

| | | | | |
|---|---|---|---|---|
| 5,710,805 A | * | 1/1998 | Armbruster et al. | ........ 455/433 |
| 5,835,860 A | * | 11/1998 | Diachina | .................... 455/458 |
| 5,850,603 A | * | 12/1998 | Lantto et al. | ................ 455/433 |
| 5,857,153 A | * | 1/1999 | Lupien | ........................ 455/436 |
| 5,905,954 A | * | 5/1999 | Nguyen | ....................... 455/433 |
| 6,032,044 A | * | 2/2000 | Shannon et al. | ............. 455/433 |
| 6,085,105 A | * | 7/2000 | Becher | ........................ 455/517 |
| 6,108,559 A | * | 8/2000 | .ANG.strom et al. | ........ 455/466 |
| 6,163,700 A | * | 12/2000 | Hussain et al. | .............. 455/453 |
| 6,182,087 B1 | * | 1/2001 | Lim | ........................... 707/204 |
| 6,223,028 B1 | * | 4/2001 | Chang et al. | ................ 455/419 |
| 6,295,447 B1 | * | 9/2001 | Reichelt et al. | ............. 455/417 |
| 6,295,455 B1 | * | 9/2001 | Fischer et al. | ............... 455/456 |
| 6,330,445 B1 | * | 12/2001 | Skog et al. | .................. 455/433 |
| 6,385,461 B1 | * | 5/2002 | Raith | ........................ 455/518 |
| 6,449,479 B1 | * | 9/2002 | Sanchez | ...................... 455/433 |
| 6,516,193 B1 | * | 2/2003 | Salmela et al. | ........... 455/432.3 |

* cited by examiner

Primary Examiner—CongVan Tran
(74) Attorney, Agent, or Firm—Cha & Reiter, L.L.C.

(57) ABSTRACT

A method of managing additional service information of a subscriber in a mobile communication system. An access switching processor (ASP) in the originating exchange requests a home location register (HLR) to change the additional service information of the subscriber. The HLR updates the additional service information and transmits the result of the updating of the additional service information to the ASP. The ASP receives the updating result from the HLR and requesting a visitor location register (VLR) to update the additional service information of the subscriber. The VLR updates the additional service information and transmits the result of the updating to the ASP.

14 Claims, 3 Drawing Sheets

METHOD OF MANAGING ADDITIONAL SERVICE INFORMATION OF A SUBSCRIBER IN A MOBILE COMMUNICATION SYSTEM

CLAIM OF PRIORITY

This application makes reference to and claims all benefits accruing under 35 U.S.C. Section 119 from an application entitled, "Method of Managing Additional Service Information of Subscriber in Mobile Communication System", filed in the Korean Industrial Property Office on Aug. 31, 1999 and there duly assigned Serial No. 99-36616.

BACKGROUND OF THE INVENTION

1. Field of the Invention

The present invention relates generally to a Code Division Multiple Access (CDMA) communication system. More particularly, the present invention relates to a method for efficiently managing additional service information of a subscriber between the mobile switching center (MSC) and the home location register (HLR).

2. Description of the Related Art

In order to initiate various service features provided in a mobile communication system, a subscriber usually presses one of the predetermined keys (e.g., *+digits+SEND key) to activate/deactivate additional service functions (i.e., call forwarding, voice mailing service, three way callng, etc.). In response to such commands, an Access Switching Processor (ASP) 111, which is provided in the originating MSC 110 to perform the message transmission to process the mobile call and manage the state management of the subscriber, transmits a feature request (FEATREQ) 210 message consisting of MIN, ESN, digits, MSCID, and other parameters relating to the subscriber, to the HLR 120. As shown in FIG. 2, the HLR 120 searches its own database based on the key input pressed by the subscriber to determine whether the requesting subscriber is registered for the additional service function. If the requesting subscriber is not registered for the additional service, the HLR 120 transmits a FEATREQ RESPONSE message 220 notifying the ASP 111 accordingly using the Announcement_List parameter of the FEATREQ RESPONSE message 220.

On the other hand, if the subscriber is registered to receive the additional service function, the HLR 120 updates additional service information of the subscriber in the database and transmits a FEATREQ RESPONSE message 220, which includes the parameters of Announcement_List and FeatureResult to the ASP 111. Then, the HLR 120 transmits a qualification directive (QUALDIR) message 230, which contains the parameters of MIN, ESN, CFI (Calling Feature Request), and etc., to a Visitor Location Register (VLR) 112 of the originating MSC to transfer the updated information of the subscriber in the VLR 112. Upon receipt of the QUALDIR message 230, the VLR 112 updates the subscriber information received from the HLR 120 and transmits a qualification directive (qualdir) response message to notify the completion of an update to the HLR 120.

As stated above in the conventional method, the HLR and the MSC together manage information necessary to activate/deactivate the additional service function during a maintenance & repair (MAP) procedure between the MSC and the HLR.

The HLR transmits a QUALDIR message to the MSC either when the OMP of the HLR changes the additional service information of the subscriber or when the MSC transmits the FEATREQ message to the HLR in response to the user's request. More frequent changes in requesting for different services through the HLR are usually initiated by the subscribers then the operator.

Therefore, the transmission of FEATREQ RESPONSE message 220 in response to the FEATREQ message 210 for activation/deactivation of the additional service, and the QUALDIR message for updating database of the VLR of the originating MSC by the HLR are inefficiently performed in the current procedure. As the maintenance & repair procedure is complicated by multiple execution steps, errors are more likely to happen. Consequently, in the event that errors occur between the HLR and the MSC, reliable subscriber information can not be provided between the systems. Therefore, the present invention proposes a more efficient way to simplify the maintenance & repair procedure.

SUMMARY OF THE INVENTION

It is, therefore, an object of the present invention to provide a method of activating/deactivating subscriber additional service information in fewer steps in a mobile communication system.

It is another object of the present invention to provide a method of reducing an error rate in processing subscriber additional service information in a mobile communication system.

It is a further object of the present invention to provide a method of ensuring subscriber information to be reliably provided in a mobile communication system.

The above objects can be achieved by providing a method of managing additional service information of a subscriber in a mobile communication system. The ASP of an originating MSC requests the HLR to change the additional service information of a subscriber. The HLR updates the additional service information and transmits the update result to the ASP. The ASP receives the updated information from the HLR and in turn requests the VLR to obtain the updated information of the subscriber. The VLR updates to the newly changed additional service information of the subscriber and transmits the update completion message to the ASP.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail as they would obscure the invention in unnecessary detail.

Figure 3:
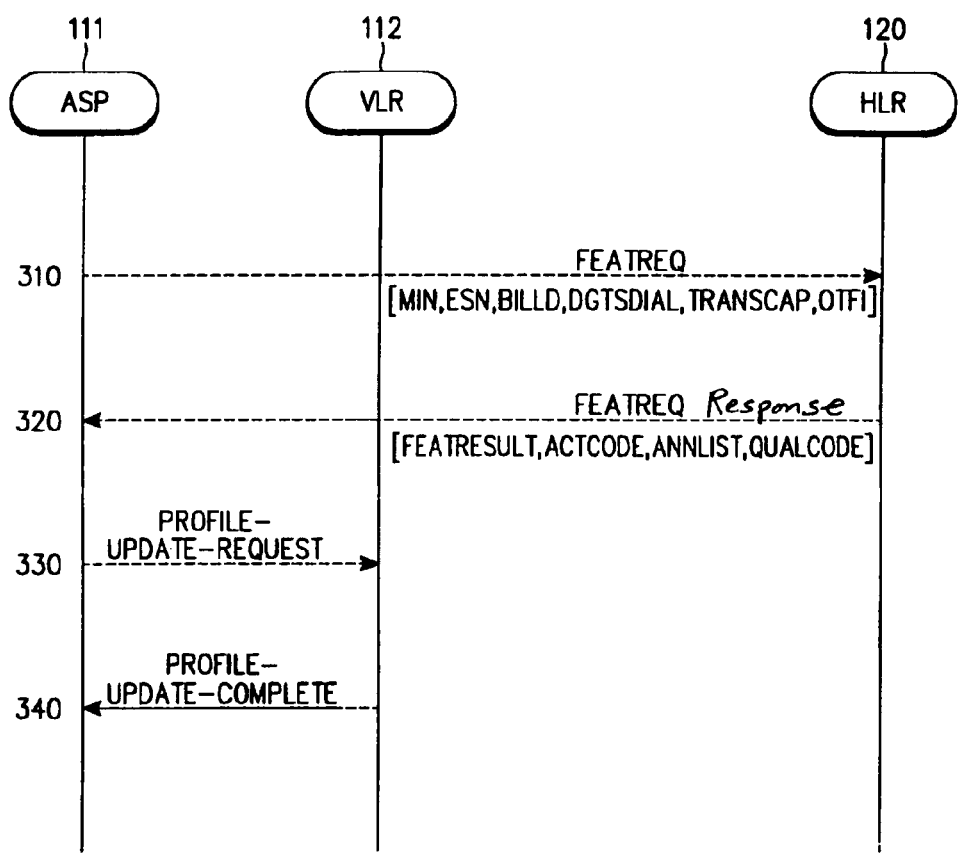

FIG. 3 is a signal flow illustrating a procedure of managing the additional service of a subscriber between the MSC and the HLR according to the present invention.

Figure 1:
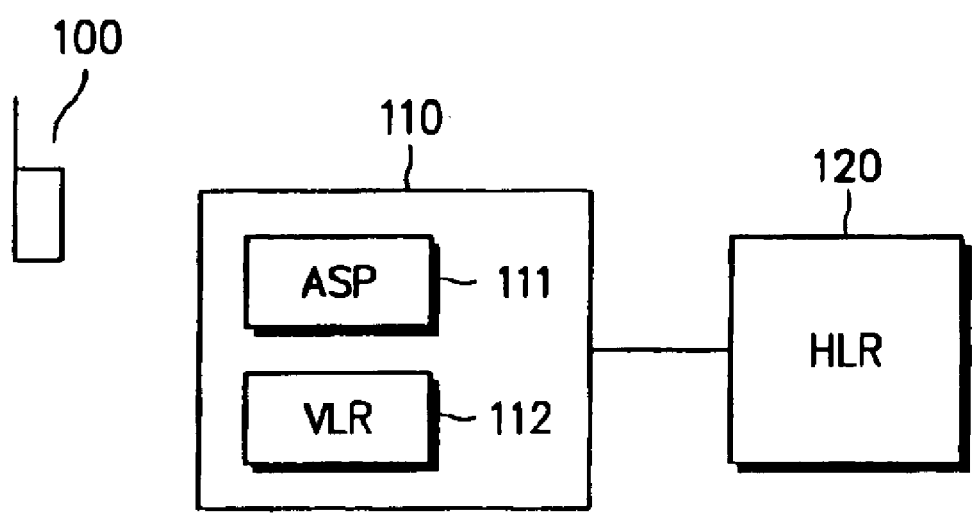
FIG. 1 is a schematic view of a mobile communications system to which the present invention is applied.
Figure 2:
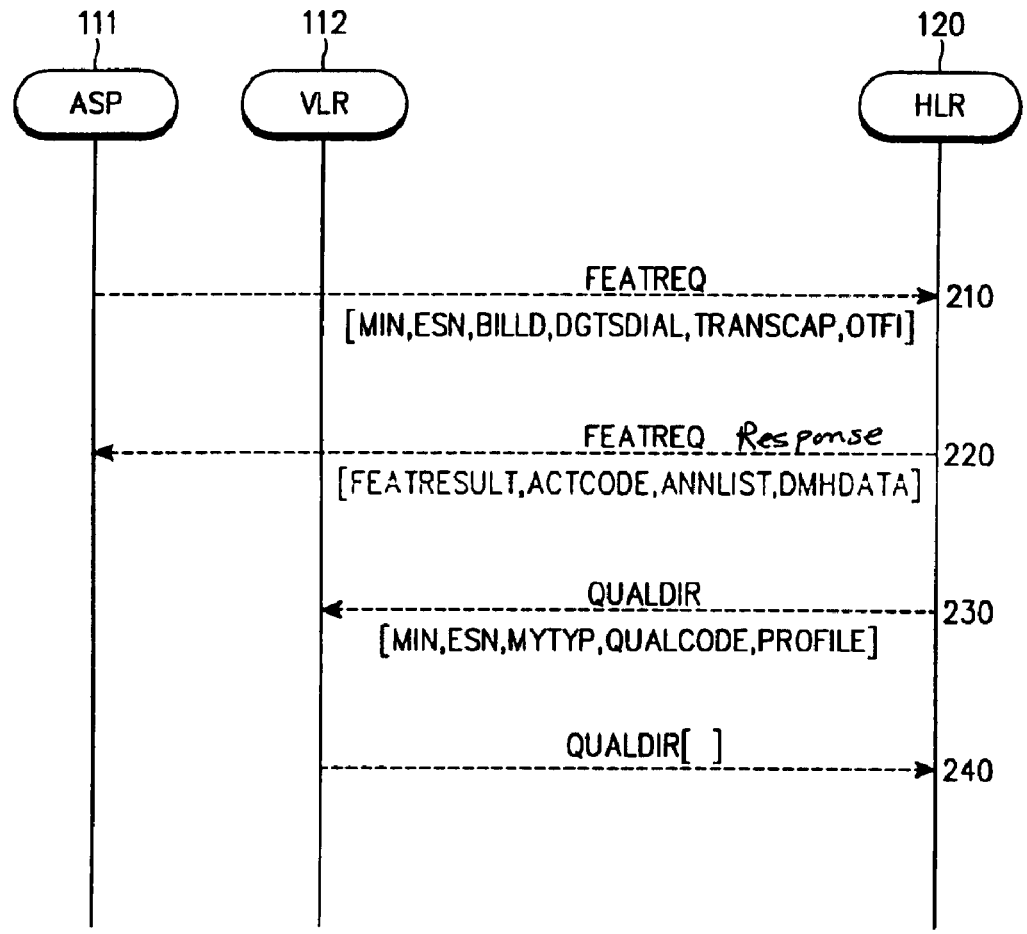
FIG. 2 is a signal flow illustrating the conventional procedure of managing information about activation/deactivation of the subscriber additional service between the MSC and the HLR; and, FIG. 3 is a signal flow illustrating the procedure of managing information about activation/deactivation of the subscriber's additional service between the MSC and the HLR according to the present invention.

Referring to FIGS. 1 and 3, the subscriber presses a corresponding key or keys in combination to activate/deactivate additional service functions (i.e., call forwarding, voice mailing service, three way calll, calling number identification feature, etc.) in a radio terminal 100. Then, the ASP 111 of the originating MSC 110 transmits a FEATREQ 310 message containing the parameters of MIN, ESN, digits, MSCD, and so on as listed in Table 1, to the HLR 120.

TABLE 1

| parameters | usage | type |
|---|---|---|
| MIN | Mobile station identification number. | M |
| ESN | Mobile station electronic serial number. | M |
| BILLID | Call ID. Used for billing and redirecting/hard handoff purposes in call routing. | M |
| DGISDIAL | Feature code string entered by the mobile station. | M |
| TRANSCAP | Indicates the currently serving MSC system's transaction capability. | M |
| OTFI | Indicates the current feature activation status. | O |

The HLR 120 searches database based on the key input pressed by the subscriber to determine whether the requested additional service function has been registered for the subscriber. After the HLR 120 updates the additional service information (i.e., call forwarding, voice mailing service, three way calling, calling number identification feature, etc.) of the subscriber based on the received key information, the HLR 120 transmits a FEATREQ Response message 320, which includes the QUALCODE and other parameters as defined in Table 2, to the ASP 111.

TABLE 2

| parameters | usage | type |
|---|---|---|
| MIN | Mobile station identification number. | O |
| ESN | Mobile station electronic serial number. | O |
| FEATRESULT | When a FeatureRequest is received, the FeatureResult transmits ACK/NACK to the MSC. | M |
| ACTCODE | Treatment defining the content which should be performed for the subscribers. If not included, treatment is based on FEATRESULT value. | O |
| ANNLIST | List of tones or announcements are transmitted according to the ANNLIST parameter. If the ANNLIST is not included, the tones or announcements are transmitted according to the FEATRESULT value. | M |
| QUALCODE | Type of qualification = validation only According to the value defined in the type of qualification, the MSC updates the database of the requesting subscriber. | O |
| AUTHDEN | Authorization denied indication and the reason for a denial. | O |
| DENAUTHPER | Indicates the duration of time period for suppressing the re-registrations of the unauthorized MS and for obtaining authorization information from the HLR by the MSC. | O |

QUALCODE, AUTHEN, and DENAUTHPER included in QUALIFICATION_DIRECTIVE are additionally defined as parameters of FEATREQ in the present invention.

If the additional service has not been registered for the subscriber, the HLR 120 transmits a FEATREQ Response message 320 notifying the ASP 111 of such determination using the Announcement_List parameter. On the other hand, if the additional service function has been registered for the subscriber, the HLR 120 updates the additional service information for the subscriber and transmits the FEATREQ Response message 320, which includes the parameters of Announcement_List, FeatureResult, QUALCODE, and etc., to the ASP 111.

The ASP 111 transmits a command Profile_Update_Request 330 to the VLR 112 to update the subscriber information as defined by the QUALCODE parameter of the FEATREQ Response message. The VLR 112 updates the profile information received from the ASP 111 in the subscriber database and transmits a command Profile_Update_Complete 340 to notify the update completion the ASP 111.

As is apparent from the foregoing, the present invention has an advantage in that upon receipt of the FETREQ message for activation/deactivation of the additional service function of the subscriber, the HLR transmits a FEATREQ Response message including the QUALCODE as an additional optional parameter to the originating MSC in such way that the conventional FEATREQ signal can still be used for controlling the additional service function. Moreover, No. 7 traffic is reduced by decreasing the number of conventional maintenance and repair (MAP) operations to one step, thereby increasing the system efficiency. Furthermore, since the MAP operation is simplified compared to the conventional system, error rate is reduced and a more reliable subscriber information management is ensured between the HLR and the MSC. As a result, the present invention will further improve the maintenance and repair (MAP) operation in terms of the system performance and the system efficiency in the current mobile communication system.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A method of managing additional service information of a subscriber of a mobile station in a mobile communication system, comprising the steps of:

transmitting from an originating mobile switching center (MSC) to a home location register (HLR) a request message for activation/deactivation of said additional service information;

updating said additional service information by said HLR; and, transmitting from said HLR to an Access Switching Processor (ASP) of said originating MSC a response message responsive to said request message, said response message includes updated information of said subscriber.

2. The method according to claim 1, further comprising the step of verifying whether said subscriber is registered for said additional service information in response to said request message received by said HLR.

3. The method according to claim 2, further comprising the step of notifying the ASP of said originating MSC if said subscriber is not registered for said additional service.

4. The method according to claim 1, wherein said additional service information includes a call forwarding request, a voice mail request, a three way calling request, and a caller identification feature request.

5. The method according to claim 1, wherein said request message comprises:

a mobile station identification number (MIN);

a mobile station serial identification number (ESN); and, said MSC identification number.

6. The method according to claim 5, wherein said request message further comprises:

feature code input information of said mobile station inputted by said subscriber;

said originating MSC capability; and, current feature activation status information.

7. The method according to claim 1, wherein said response message having a preselected set of message types comprises:

a mobile station identification number (MIN);

a mobile station serial identification number (ESN);

qualification information for said MSC to update the information of said subscriber;

authorization notification for indicating reasons for denying the activation of said additional service information of said subscriber by said HLR; and, de-authorization notification for suppressing a re-registry of said denied subscriber for a predetermined time period.

8. A method of managing additional service information of a subscriber in a mobile communication system, comprising the steps of:

transmitting from an access switching processor (ASP) of an originating mobile switching center (MSC) to a home location register (HLR) coupled to said MSC a request message to change the additional service information of said subscriber;

updating said additional service information by said HLR in response to said request message; transmitting from said HLR to said ASP a response message responsive to said request message, said response message includes said updated information;

transmitting from said ASP to a visitor location register (VLR) coupled to said MSC said updated information received from said HLR; and, transmitting an update completion message to said ASP to notify the receipt of said updated information by said VLR.

9. The method according to claim 8, further comprising the step of verifying whether said subscriber is registered for said additional service information.

10. The method according to claim 9, further comprising the step of notifying said originating MSC if said subscriber is not registered for said additional service information via said response message.

11. The method according to claim 8, wherein said request message comprises:

a mobile station identification number (MIN);

a mobile station serial identification number (ESN); and, said MSC identification number.

12. The method according to claim 8, wherein said request message further comprises:

feature code input information of said mobile station inputted by said subscriber;

said originating MSC capability; and, current feature activation status information.

13. The method according to claim 8, wherein said response message having a preselected set of message types comprises:

a mobile station identification number (MIN);

a mobile station serial identification number (ESN);

qualification information for said MSC to update the information of said subscriber;

authorization notification for indicating reasons for denying the activation of said additional service information of said subscriber by said HLR; and, de-authorization notification for suppressing a re-registry of said denied subscriber for a predetermined time period.

14. The method according to claim 8, wherein said additional service information includes a call forwarding request, a voice mail request, a three way calling request, and a caller identification feature request.

* * * * *